US007461008B2

(12) United States Patent
Garrow et al.

(10) Patent No.: US 7,461,008 B2
(45) Date of Patent: Dec. 2, 2008

(54) PLANNING AND SCHEDULING MODIFICATION OF A CONFIGURATION

(75) Inventors: Gary R. Garrow, Burbank, CA (US); Charles P. Newton, III, Rock Hill, SC (US); Patrick E. Weir, San Francisco, CA (US); David P. West, II, Newnan, GA (US); Michael Wetzer, Redwood City, CA (US)

(73) Assignee: Accenture Global Services GmbH, Schauffhausen (CH)

( * ) Notice: Subject to any disclaimer, the term of this patent is extended or adjusted under 35 U.S.C. 154(b) by 921 days.

(21) Appl. No.: 09/947,136

(22) Filed: Sep. 4, 2001

(65) Prior Publication Data

US 2005/0283392 A1    Dec. 22, 2005

(51) Int. Cl.
*G05B 19/418* (2006.01)
(52) U.S. Cl. ........................................................ 705/8
(58) Field of Classification Search ................. 705/8
See application file for complete search history.

(56) References Cited

U.S. PATENT DOCUMENTS

| | | | |
|---|---|---|---|
| 4,744,026 A | | 5/1988 | Vanderbei |
| 4,908,775 A | | 3/1990 | Palusamy et al. |
| 5,216,612 A | * | 6/1993 | Cornett et al. ............ 700/96 |
| 5,295,065 A | | 3/1994 | Chapman et al. |
| 5,311,562 A | | 5/1994 | Palusamy et al. |
| 5,331,579 A | | 7/1994 | Maguire, Jr. et al. |
| 5,343,388 A | | 8/1994 | Wedelin |
| 5,434,775 A | | 7/1995 | Sims et al. |
| 5,596,507 A | | 1/1997 | Jones et al. |
| 5,630,070 A | | 5/1997 | Dietrich et al. |
| 5,710,723 A | | 1/1998 | Hoth et al. |
| 5,737,728 A | | 4/1998 | Sisley et al. |
| 5,754,451 A | | 5/1998 | Williams |
| 5,778,381 A | * | 7/1998 | Sandifer ................ 707/104.1 |
| 5,826,236 A | | 10/1998 | Narimatsu et al. |

(Continued)

FOREIGN PATENT DOCUMENTS

EP    0639815 A2 *  2/1995

(Continued)

OTHER PUBLICATIONS

IBM Technical Disclosure Bulletin, Computer-Aided Process Planning, v.37, n.4B, p. 605-608, [online], [retrieved Sep. 11, 2005 via East] (3 pages).*

(Continued)

*Primary Examiner*—Beth V. Boswell
*Assistant Examiner*—Peter Choi
(74) *Attorney, Agent, or Firm*—Brinks Hofer Gilson & Lione

(57) ABSTRACT

A method and system of planning modification of a configuration of an item of equipment supports an integrated approach toward managing one or more configuration modifications and planning and scheduling issues. Planning factors are tracked. One or more planning factors are relevant to a modification of a configuration of an item of equipment. A balanced configuration modification plan and schedule is arranged based on the planning factors. It is decided whether to institute the balanced configuration plan or at least a portion of the balanced configuration plan. The resources to carry out the balanced configuration plan are allocated.

8 Claims, 5 Drawing Sheets

U.S. PATENT DOCUMENTS

| | | | | |
|---|---|---|---|---|
| 5,877,961 | A | 3/1999 | Moore | |
| 5,890,133 | A | 3/1999 | Ernst | |
| 5,897,629 | A * | 4/1999 | Shinagawa et al. | 706/13 |
| 5,918,219 | A | 6/1999 | Isherwood | |
| 5,920,846 | A * | 7/1999 | Storch et al. | 705/73 |
| 5,931,878 | A | 8/1999 | Chapin, Jr. | |
| 5,963,911 | A | 10/1999 | Walker et al. | |
| 5,970,437 | A | 10/1999 | Gorman et al. | |
| 5,970,466 | A * | 10/1999 | Detjen et al. | 705/8 |
| 5,987,474 | A | 11/1999 | Sandifer | |
| 5,995,915 | A * | 11/1999 | Reed et al. | 702/119 |
| 6,006,171 | A * | 12/1999 | Vines et al. | 702/184 |
| 6,014,633 | A | 1/2000 | DeBusk et al. | |
| 6,038,539 | A | 3/2000 | Maruyama et al. | |
| 6,067,486 | A | 5/2000 | Aragones et al. | |
| 6,078,912 | A | 6/2000 | Buerger et al. | |
| 6,101,481 | A | 8/2000 | Miller | |
| 6,110,214 | A | 8/2000 | Klimasauskas | |
| 6,128,543 | A | 10/2000 | Hitchner | |
| 6,154,735 | A | 11/2000 | Crone | |
| 6,175,934 | B1 | 1/2001 | Hershey et al. | |
| 6,192,325 | B1 | 2/2001 | Piety et al. | |
| 6,208,955 | B1 | 3/2001 | Provan et al. | |
| 6,219,654 | B1 * | 4/2001 | Ruffin | 705/400 |
| 6,230,200 | B1 * | 5/2001 | Forecast et al. | 709/226 |
| 6,230,480 | B1 | 5/2001 | Rollins, III | |
| 6,292,806 | B1 * | 9/2001 | Sandifer | 707/104.1 |
| 6,308,162 | B1 | 10/2001 | Oulmet et al. | |
| 6,321,207 | B1 | 11/2001 | Ye | |
| 6,349,274 | B1 | 2/2002 | Kay et al. | |
| 6,418,361 | B2 * | 7/2002 | Sinex | 701/29 |
| 6,496,814 | B1 | 12/2002 | Busche | |
| 6,571,158 | B2 | 5/2003 | Sinex | |
| 6,580,982 | B2 | 6/2003 | Sinex | |
| 6,594,786 | B1 * | 7/2003 | Connelly et al. | 714/50 |
| 6,598,940 | B2 | 7/2003 | Sinex | |
| 6,606,546 | B2 * | 8/2003 | Sinex | 701/29 |
| 6,671,593 | B2 | 12/2003 | Sinex | |
| 6,678,716 | B1 | 1/2004 | Pronsati, Jr. et al. | |
| 6,684,136 | B2 | 1/2004 | Sinex | |
| 6,691,006 | B2 * | 2/2004 | Sinex | 701/29 |
| 6,691,064 | B2 | 2/2004 | Vroman | |
| 6,691,244 | B1 * | 2/2004 | Kampe et al. | 714/4 |
| 6,701,298 | B1 | 3/2004 | Jutsen | |
| 6,714,829 | B1 * | 3/2004 | Wong | 700/101 |
| 6,732,028 | B2 * | 5/2004 | Vanstory et al. | 701/33 |
| 6,738,748 | B2 | 5/2004 | Wetzer | |
| 6,801,820 | B1 * | 10/2004 | Lilly et al. | 700/100 |
| 6,820,038 | B1 | 11/2004 | Wetzer et al. | |
| 6,980,959 | B1 | 12/2005 | Garrow et al. | |
| 7,031,941 | B2 | 4/2006 | Garrow et al. | |
| 7,058,587 | B1 | 6/2006 | Horne | |
| 7,085,766 | B2 | 8/2006 | Keith, Jr. | |
| 7,124,059 | B2 | 10/2006 | Wetzer et al. | |
| 7,231,374 | B1 * | 6/2007 | Balasinski | 705/400 |
| 2001/0053991 | A1 * | 12/2001 | Bonabeau | 705/7 |
| 2002/0007225 | A1 * | 1/2002 | Costello et al. | 700/99 |
| 2002/0010615 | A1 | 1/2002 | Jacobs | |
| 2002/0022984 | A1 | 2/2002 | Daniel et al. | |
| 2002/0072988 | A1 | 6/2002 | Aram | |
| 2002/0143564 | A1 | 10/2002 | Webb et al. | |
| 2002/0156692 | A1 * | 10/2002 | Squeglia et al. | 705/26 |
| 2003/0009253 | A1 | 1/2003 | McIntyre et al. | |
| 2003/0036939 | A1 | 2/2003 | Flores et al. | |
| 2003/0050824 | A1 | 3/2003 | Suermondt et al. | |
| 2003/0216888 | A1 | 11/2003 | Ridolfo | |
| 2004/0019577 | A1 | 1/2004 | Abdel-Malek et al. | |
| 2005/0187838 | A1 * | 8/2005 | Squeglia et al. | 705/29 |
| 2007/0203779 | A1 | 8/2007 | Tveit et al. | |

FOREIGN PATENT DOCUMENTS

| | | | |
|---|---|---|---|
| EP | 1162557 A | | 12/2001 |
| JP | 60165325 | | 2/1984 |
| JP | 62026510 A | | 2/1987 |
| JP | 02065201 | | 8/1988 |
| JP | 02127952 | | 11/1988 |
| JP | 03264250 A | | 11/1991 |
| JP | 04025350 A | | 1/1992 |
| JP | 07203120 | | 12/1993 |
| JP | 08180654 | | 12/1994 |
| JP | 08263546 A | * | 10/1996 |
| JP | 07060449 | | 2/1997 |
| JP | 9034946 | | 2/1997 |
| JP | 09050599 A | * | 2/1997 |
| JP | 10298351 | | 4/1997 |
| JP | 09212555 A | | 8/1997 |
| JP | 10027200 A | * | 1/1998 |
| JP | 11210106 | | 1/1998 |
| JP | 2000015587 | | 6/1998 |
| JP | 2000123089 A | * | 4/2000 |
| JP | 2000124094 | | 4/2000 |
| JP | 2001034324 A | * | 2/2001 |
| JP | 2001092520 | | 4/2001 |
| JP | 2001209676 A | * | 8/2001 |
| WO | WO-98/44439 A1 | * | 10/1998 |
| WO | WO 01/15001 | | 3/2001 |

OTHER PUBLICATIONS

Vijayan, Jaikumar. "Fault-Tolerant Computing". Nov. 20, 2000. Computerworld. vol. 34, Issue 47.*

Koch, Bill. "Manage Data to Tame the Maintenance Tiger". Mar./Apr. 2001. Electrical World. vol. 215, Issue 2.*

Ho, Kun-Wai; Chan, Ling-Yau. "An On-line System for Aircraft Maintenance". Sep. 1994. Journal of Systems Management. vol. 45, Issue 9. pp. 24-27.*

McQueen, G., "Aircraft Maintenance," *Industrial Maintenance & Plant Operations*, Aug. 1996, (7 pages).

MIL-HDBK-61. Military Handbook, "Configuration Management Guidance," Sep. 1997, (pp. cover, iii, iv, vii, viii; 1- 3,4,7,8; 2-3,4,7,8,11,12,15,16,19,20,23,24,27,28,31,32,35,36,39,40; 3-3,4,7,8,11,12,15,16,19,20,23,24,27,28,31,32,35,36,39,40,42; 4-1,4,5,8,9,12,13,16,17,20,21,24,25,28,29; 5- 2,3,6,7; 6- 2,3,6,710,11; 7- 2,3,6,7,10; A- 1,4,5,8; B- 1,4,5,8,9,12; C- 1,4,5; D- 2,3,6,7; E- 2,3; and F- 3,4.).

Knotts, Robert M.H., Civil Aircraft Maintenance and Support; Fault Diagnosis from a Business Perspective, Journal of Quality in Maintenance Engineering, vol. 5 No. 4, 1999, pp. 335-347. [Dialog; File 15].

Swanson, Computerized maintenance management systems: a study of system design, Production and Inventory Management Journal, 2nd Qtr 1997, v.38, n.2, p. 11-15 (5 pages).

Dilger, Asset management, maintenance redefined, Manufacturing Systems, Jul. 1997, v.15, n.7, p. 122-128, [on-line], [retrieved Sep. 8, 2005 via Dialog file 624.01167091] (8 pages).

Koch, Manage data to tame the maintenance tiger, Electrical World, Mar./Apr. 2001, v.215, n.2, p. 37. [on-line], retrieved Sep. 8, 2005 via Dialog file 624:01167091] (4 pages).

Anonymous, maintenance mania, Manufacturing Systems, May 1998, v.16, n.5, p. 80-84, [on-line], [retrieved Sep. 8, 2005 via Dialog file 15:01650138] (4 pages).

Fulcher, ERP and PDM equals productivity, manufacturing systems, Aug. 1998, v.16, n.8, p. 36-40, [online], [retrieved Sep. 8, 2005 via Dialog file 15:01690148] (5 pages).

Al-Sultan, Maintenance control via mathematical programming, Journal of Quality in Maintenance Engineering, 1995, v.1, n.3, p. 36-46, [online], [retrieved Sep. 8, 2005 via Dialog file 15:02271208] (9 pages).

Avery, Datastream introduces new online buy system for MRO, Purchasing, Nov. 18, 1999, v.127, n.122 (1 page).

Szwedo, Increasing productivity in an AS/RS maintenance department, Production and Inventory Management Journal, 1st Qtr 1995, v.36, n.1, p. 76-81 (6 pages).

Ho, An on-line system for aircraft maintenance, Journal of Systems Management, Sep. 1994, v.45, n.9, p. 24-27 (4 pages).

Anonymous, Bell & Howell offers maintenance kits, today, Feb. 2000, v.22, n.1, p. 10 (1 page).

Kroenke, David M. Database Processing: Fundamentals, Design and Implementation, 1999 Prentice-Hall; NJ. pp. 3-23 (23 pages).

International Search Report dated Oct. 4, 2002, for corresponding international application PCT/US02/09303 (1 page).

Written Opinion dated Mar. 5, 2003, for corresponding international application PCT/US02/09303 (6 pages).

International Search Report dated Dec. 28, 2001, for corresponding international application PCT/US01/32154 (1 page).

International Search Report dated Jan. 2, 2002, for corresponding international application PCT/US01/32576 (1 page).

Parker A. Grant and James F. Mazeski; "Turbine Engine Maintenance-Back to Basics", Aircraft Maintenance Technology, Nov. 2000, retrieved from the web at: http://amtonline.com/publication/article.jsp?pubId=1&d=1035.

Manny Gdalevitch, "MSG-3, The Intelligent Maintenance", Nov. 2000, Aircraft Maintenance Technology, pp. 1-6, retrieved from the web at: http://amtonline.com/publication/article.jsp?pubId=I=&id=1039.

Harry Fenton, "Magnetos Under PressureMagnetos Under Pressure", Jul. 2000, retrieved from the web at: http://amtonline.com/publication/article.jsp?pubId=1 &id=992.

Jack Hessburg, "Scheduled Maintenance Tasks: Working through the development process with the Maintenance Steering Group", Mar. 2000, retrieved from the web at: http://amtonline.com/publication/article.jsp?pubId=1&id=950.

Bill de Decker, "Save on Maintenance Costs", Mar. 2000, retrieved from the web at: http://amtonline.com/publication/article.jsp?pubid=I &id=952.

Michael M. DiMauro, "Preventive Maintenance for Thrust Reversers", Mar. 2000, retrieved from the web at: http://amtonline.com/publication/article.jsp?pubid=I &id=947.

Airman 2000: simplifying and optimizing aircraft maintenance, pp. 1-3, retrieved from the web at: http://www.content.airbusworld.convsites/Customerservices/html/acrobattfast29_pO2_07_airman.pdf, Dec. 2000.

McQueen, G. "Aircraft Maintenance," Industrial Maintenance & Plant Operations, Aug. 1996.

MIL-HDBK-61, Military Handbook, "Configuration Management Guidance," Sep. 1997.

IBM Technical Disclosure Bulletin, Computer-Aided Process Planning, v.37, n.4B, p. 605-608, [online], [retrieved Sep. 11, 2005 via East] (3 pages).

The prosecution history of U.S. Appl. No. 09/825,633 shown in the attached Patent Application Retrieval file wrapper document list, printed Mar. 7, 2008, including each substantive office action and applicant response.

The prosecution history of U.S. Appl. No. 09/947,024 shown in the attached Patent Application Retrieval file wrapper document list, printed Mar. 7, 2008, including each substantive office action and application response.

The prosecution history of U.S. Appl. No. 09/946,894 shown in the attached Patent Application Retrieval file wrapper document list, printed Mar. 7, 2008, including each substantive office action and application response.

The prosecution history of U.S. Appl. No. 09/946,093 shown in the attached Patent Application Retrieval file wrapper document list, printed Mar. 7, 2008, including each substantive office action and applicant response.

The prosecution history of U.S. Appl. No. 09/946,095 shown in the attached Patent Application Retrieval file wrapper document list, printed Mar. 7, 2008, including each substantive office action and applicant response.

The prosecution history of U.S. Appl. No. 09/946,032 shown in the attached Patent Application Retrieval file wrapper document list, printed Mar. 7, 2008, including each substantive office action and applicant response.

The prosecution history of U.S. Appl. No. 09/946,160 shown in the attached Patent Application Retrieval file wrapper document list, printed Mar. 7, 2008, including each substantive office action and applicant response.

The prosecution history of U.S. Appl. No. 10/799,914 shown in the attached Patent Application Retrieval file wrapper document list, printed Mar. 7, 2008, including each substantive office action and applicant response.

The prosecution history of U.S. Appl. No. 09/947,157 shown in the attached Patent Application Retrieval file wrapper document list, printed Apr. 2, 2008, including each substantive office action and applicant response.

The prosecution history of U.S. Appl. No. 09/690,793 shown in the attached Patent Application Retrieval file wrapper document list, printed Mar. 7, 2008, including each substantive office action and applicant response.

* cited by examiner

PLANNING AND SCHEDULING MODIFICATION OF A CONFIGURATION

FIELD OF THE INVENTION

This invention relates to a method and system for planning and scheduling modification of a configuration of at least one item of the equipment.

BACKGROUND OF THE INVENTION

A configuration is associated with an item of equipment and defines the item of equipment. The configuration may evolve over time. For example, the configuration of an item of equipment may be updated to realize improved functionality, ease of maintenance, or correction of a previously unknown deficiency in the equipment. The configuration may be updated in accordance with a configuration plan which may define certain aspects of an update or revision.

Nevertheless, one or more discrepancies may arise between similar items of equipment, as where one item of equipment is updated prior to another similar item of equipment. Other discrepancies between similar items of equipment may arise when the revision of a configuration for one item of equipment is performed in a different order than the revision for a configuration of similar equipment. The replacement order of the revision may impact equipment performance or future revision where a revision is carried out in a piecemeal fashion over time. For example, a replacement component used in an earlier upgrade may no longer be available for a subsequent upgrade, even where both items of equipment would ordinarily call for the exact same replacement component. Even if upgrades are completed simultaneously or within a short interval of each other for different items of similar equipment, the information on the maintenance of that configuration may differ from item of equipment to another because of improper or inadequate record-keeping procedures. Thus, the need exists for planning and scheduling modifications to equipment in a coordinated manner that reduces or eliminates perceived or actual discrepancies between similar items of equipment.

SUMMARY OF THE INVENTION

In accordance with the invention, a method of planning modification of a configuration of an item of equipment supports an integrated approach toward managing one or more configuration modifications, including planning and scheduling issues. Planning factors are tracked. Planning factors refer to one or more of the following: component characteristics, assembly characteristics, equipment characteristics, maintenance-provider characteristics, resource availability, component availability, assembly availability, equipment availability, maintenance-activity logistics, safety concerns, contractual obligations, legal obligations, and other factors that impact the provision of a modification of equipment. One or more planning factors may be relevant to a modification of a configuration of an item of equipment. A balanced configuration modification plan and maintenance schedule is arranged based on the planning factors. It is decided whether to institute the balanced configuration plan or at least a portion of the balanced configuration plan. The resources to carry out the balanced configuration plan are allocated. For example, at least one of manpower, facilities, components and tooling is allocated consistent with the balanced configuration plan.

DETAILED DESCRIPTION OF THE INVENTION

As used herein, a maintenance provider shall include any person or business entity that performs or supports maintenance, overhaul or repair activity (i.e., an MRO activity) for at least one item of equipment. Similarly, maintenance, a maintenance activity or a maintenance task shall include at least one of maintenance, repair, and overhaul (i.e., MRO) of an item of equipment or a component of the equipment.

A component means a component of an item of equipment, a sub-component of an item of equipment, an assembly of an item of equipment, a system of an item of equipment, or any other constituent part of an item of equipment. A component may include, but need not include, one or more sub-components. An assembly may comprise a group of integrated or inter-related components. A material refers to a raw material, a consumable, a component, a provision, or another equipment-related resource concerning the performance of a maintenance activity.

Figure 1:
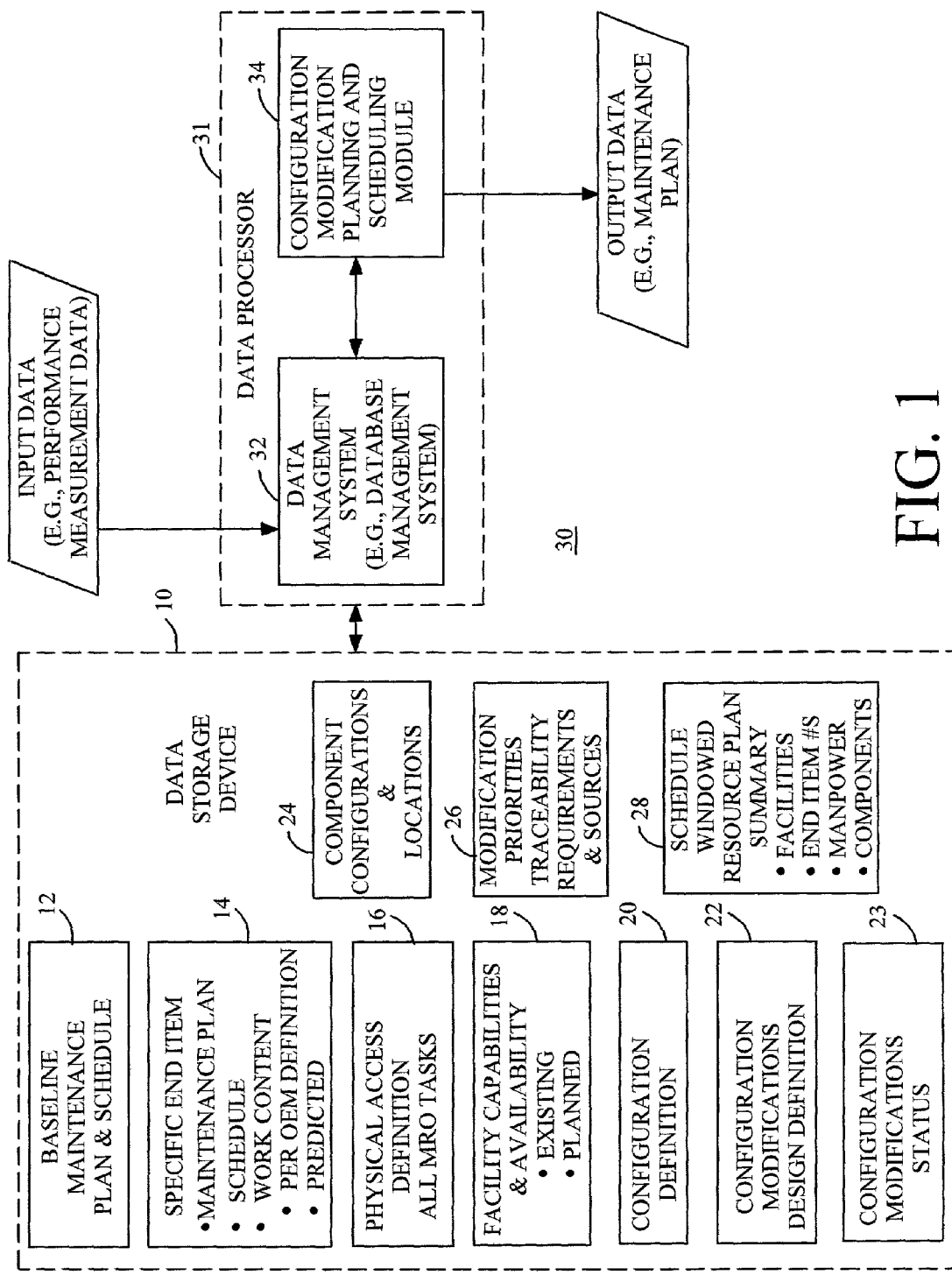
FIG. 1 is a block diagram of a planning and scheduling modification system in accordance with the invention.

In accordance with the invention, FIG. 1 shows a block diagram of a data processing system 30 for planning and scheduling one or more modifications of at least one item of equipment. The data processing system 30 of FIG. 1 comprises a data processor 31 coupled to a data storage device 10. The data processor 31 includes at least a data management system 32 in communications with a configuration module 34.

The data storage device 10 may store one or more data storage allocations (e.g., databases) associated with planning and scheduling modifications to one or more configurations. As illustrated in FIG. 1, the data storage device 10 includes one or more of the following data storage allocations: a baseline maintenance plan and schedule 12, a specific end item maintenance plan and schedule 14, a physical access definition 16, facility capabilities and availability 18, configuration definitions 20, configuration modifications and design definitions 22, configuration modifications and status 23, component configurations and locations 24, modification priorities traceability requirements and sources 26, and windowed resource plan summary 28.

The baseline maintenance plan and schedule 12 refers to a template or general pattern of a maintenance plan that may be associated with an item of equipment. The baseline maintenance plan 12 provides a guide for maintenance for a particular type, class, model, or configuration of equipment. The baseline maintenance plan 12 may constitute a preliminary maintenance plan or the baseline maintenance plan may be used to construct a preliminary maintenance plan.

In one embodiment, the baseline maintenance plan 12 may comprise an equipment identifier, a component identifier, a maintenance activity descriptor, a maintenance activity date, and maintenance priority indicator. The component identifier is associated with a corresponding maintenance activity date and a corresponding maintenance activity descriptor. The maintenance activity descriptor may describe whether the associated component is to be replaced, repaired, refurbished, rebuilt, adjusted, deleted, or otherwise handled. The maintenance activity may be classified as mandatory or optional by the priority indicator.

In one embodiment, the baseline maintenance plan 12 is based upon data provided by a manufacturer of equipment. In another embodiment, the baseline maintenance plan 12 is based on historical maintenance activity and associated reliability or availability of one or more items of equipment.

The specific item maintenance plan 14 refers to a maintenance plan that is tailored for a particular item (e.g., identified by serial number) of equipment. For example, the specific item maintenance plan 14 may be derived from a baseline maintenance plan 12 based on historical maintenance data associated with a particular item of equipment. The specific item maintenance plan 14 may include a maintenance plan schedule, a work content definition, a original equipment manufacturer's definition of work content, and a predicted definition of work content. In another embodiment, the specific item maintenance plan may have data fields or entries that generally track or resemble those of the baseline maintenance plan 12.

A physical access definition 16 defines a degree of physical access that is necessary to conduct a maintenance activity on an item of equipment, an assembly, a system, or a component of an item of equipment. The physical access definition 16 may include a duration indicator associated with a maintenance activity. The duration indicator indicates the length that access to the equipment is required. The physical access definition 16 may also include a zone indicator or a location indicator associated with a maintenance activity or a component identifier to define a location on the equipment where maintenance activity may be required.

The configuration definition 20 defines the constituent elements of an item of equipment and the relationship among the constituent elements. An item of equipment may be defined in terms of components, one or more assemblies of components, one or more systems, or by other constituent elements. The components, assembly, and system may be interrelated to one another in accordance with one or more of the following: a physical dimension, a logical dimension, an operational dimension, and a functional dimension. Consistent with the foregoing dimensions, a configuration of an item of equipment may be described as a combination of one or more of the following: a logical configuration, an operational configuration, a functional configuration, a physical configuration, a redundant configuration and a self-healing configuration. A logical configuration defines the interrelationships among components, sub-components, a system, an assembly, or other parts of equipment. A physical configuration defines or identifies one or more of the following: components, subcomponents, a system, and an assembly for a complete, operational item of equipment. A functional configuration defines what technical specifications (e.g., performance specifications) the item of equipment is expected or desired to meet. An operational configuration defines the operational performance of a particular item of equipment, with respect to the particular item as a whole, or any of its constituent parts, including components, subcomponents, assemblies, and systems. A redundant configuration may include hot-standby or duplicate components, systems, or assemblies that take over upon the failure of primary component, system or assembly. A self-healing configuration may include architecture that is fault tolerant with respect to redundant software, redundant hardware, or other technical enhancements.

The component configurations 24 define the configurations associated with corresponding components. The component configurations 24 may be defined by a group of sub-components (e.g., parts) and the relationship among the sub-components. Each sub-component may be associated with a location identifier that identifies the location of the sub-component relative to a corresponding component. The relationship among the sub-components may be described in conformance with one or more of the following: a physical dimension, a logical dimension, an operational dimension, and a functional dimension.

The modification priorities 26 may be organized as priority levels associated with different maintenance activities. Alternatively, the sequence of maintenance activities may reflect the priority levels in a transparent manner to a maintenance provider.

The data storage allocations may include a traceability requirement. Traceability requirements include a historical record of a maintenance activity by equipment identifier or otherwise. The historical record preferably supports searches by maintenance activity, maintenance date, equipment identifier, component identifier, system identifier, maintenance worker, maintenance location, or by other terms. The historical record of maintenance activity supports analysis of the maintenance activity for one or more of the following: servicing of one or more similar items of equipment, feedback data for predictive maintenance, legal requirements, equipment failure investigation, and accident investigation.

The schedule-windowed-resource plan 28 comprises temporal availability data that supports the formation of an integrated maintenance plan that brings together one or more of the following: components, assemblies, systems, and resources required for maintenance for a common time window. The resources may include one or more of the following: equipment-related resources, human resources, and maintenance resources. Equipment-related resources refers to any component, sub-component, material, raw material, consumable, and any other part that supports maintenance of an item of equipment. Human resources refer to any maintenance worker, qualified maintenance worker, technician, supervisor, and any other worker who contributes to the performance of maintenance. Maintenance resources refer to any facility or space for performing a maintenance activity, any tool, test equipment, test fixture, diagnostic test equipment, and any other devices that support the performance of maintenance. Tools comprise hand tools, test equipment, a test fixture, diagnostic test equipment and any other implements for performing maintenance on the equipment.

The data management system 32 (e.g., a database management system) manages storage and retrieval of data from one or more of the foregoing data storage allocations in the data storage device 10. In one embodiment, each data storage allocation may be associated with a separate database. The data management system 32 provides input from one or more data storage allocations to the configuration module 34 (e.g., configuration modification planning and scheduling module).

Based on the information provided from the data storage device 10, the configuration module 34 establishes an integrated maintenance plan for an item of equipment. The configuration module may establish a preliminary maintenance plan, a resultant maintenance plan that refines a preliminary maintenance plan, or both a preliminary maintenance plan and a resultant maintenance plan. The configuration module 34 supports configuration modification, planning and scheduling. The integrated maintenance plan may include bringing together components and resources at a common geographic location for a time window or duration sufficient to complete a scheduled maintenance activity. The integrated maintenance plan includes one or more of the following: a priority for the maintenance activity, the requisite access (e.g., equipment location or zone and requisite duration of access) to the equipment to perform the maintenance activity, alternate components, assemblies or systems that are available to facilitate a timely performance of the maintenance activity, a forecast of the availability of resources and components required for a maintenance activity, and historical record-keeping of maintenance activity to support auditing of previous maintenance activity. Resources may include qualified human resources, qualified maintenance workers, test equipment, diagnostic equipment, facilities and other resources necessary to make repair or conduct a maintenance activity.

In one embodiment, the configuration module 34 may facilitate preparing a list of alternate or secondary components that are associated with the configuration definition. The alternate components and associated configurations for an equipment item define replacements for primary components and their associated primary configurations.

In another embodiment, the configuration module 34 may support the provision of forecasts and summary logistics. The forecasts refer to forecasts of scheduled maintenance activities that may be necessary to keep the equipment function at a desired level of availability or reliability. Summary of logistics represent the tracking of changes to the equipment item on a real time basis to allow visibility to different users to promote coordination and error reduction in the modification process.

Figure 2:
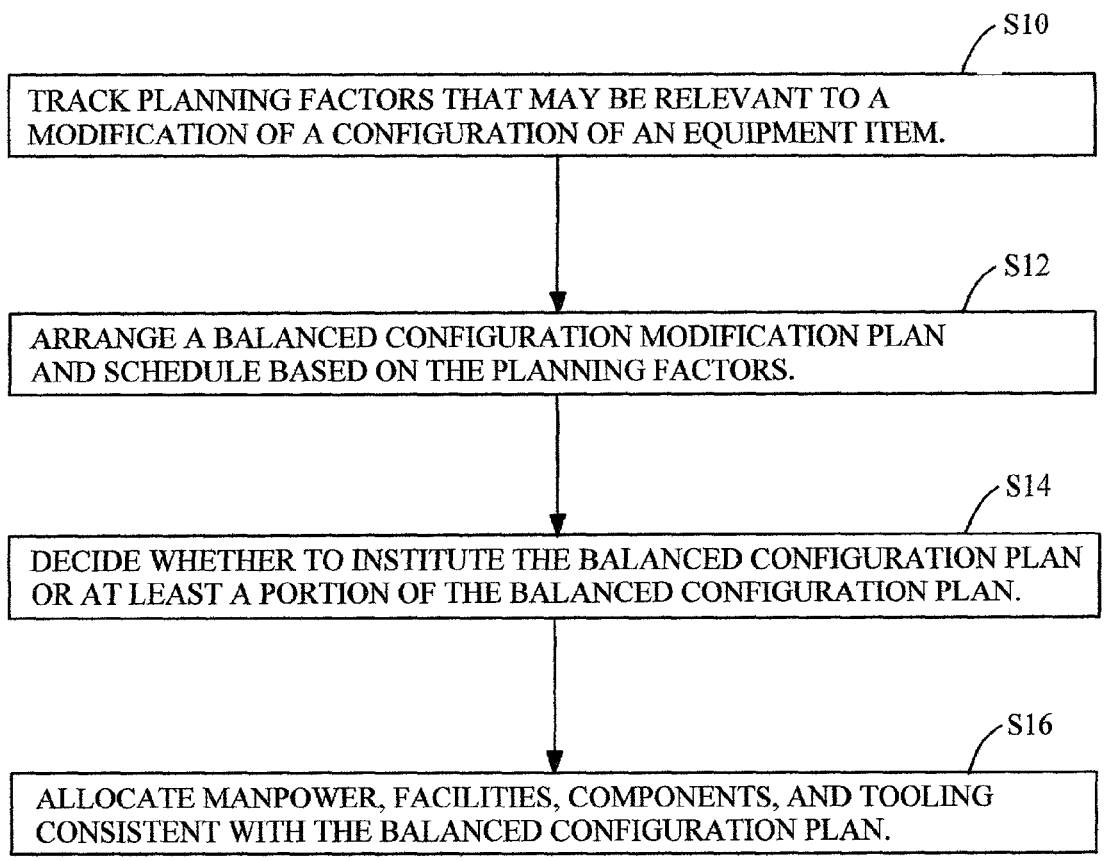
FIG. 2 is a flow chart of a method for planning and scheduling a modification of an item of equipment in accordance with the invention.

The method of planning and scheduling modifications to one or more configurations is described in the flowchart of FIG. 2. The method of FIG. 2 begins in step S10.

In step S10, the data processing system 30 tracks planning factors that may be relevant to a modification of a configuration of an item of equipment. The data processing system 30 may support storage and retrieval of planning factors from one or more data storage allocations of the data storage device 10. Planning factors may include one or more of the following: legal requirements for maintaining, overhauling or repairing an item of equipment, technical requirements of an item of equipment, technical requirements associated with a priority of modification of different components of an item of equipment, the availability of components, the availability of alternate components for a maintenance activity, the access to maintenance resources, the access of the item of equipment to maintenance equipment, preparing facilities, test equipment, diagnostic equipment, and facility space.

Other planning factors that may be relevant to modification of a configuration include predictive factors that relate to maintaining the availability and reliability of the equipment. For example, predictive factors may define a time interval or a future date or a duration that is associated with replacement of a component, an assembly or a system of an item of equipment to maintain a desired level of reliability and availability of the equipment for use.

The data storage allocations of the data storage device 10 of FIG. 1 supports storage and retrieval of one or more planning factors for planning and schedule modifications of a configuration. For example, in the data allocation of the configuration definition 20, planning factors of configuration data may include legal requirement data and technical requirement data. The legal requirement data and technical requirement data may provide a basis for determining the priority of modification of corresponding different components of the item of equipment. Further, the configuration data may list alternate components and associated alternate configurations for an item. The alternate components or secondary components may be organized as replacement for primary components and their associated primary configurations.

For the data allocation of facilities capability and availability 18, the planning factors may include maintaining temporal availability data on at least one of maintenance equipment, repair facilities, test equipment, diagnostic equipment, or the like.

In the data allocation of the traceability 26, the planning factors may include maintaining traceability data to track changes in an item on a real-time basis through different users associated with a maintenance provider to promote coordination and error reduction in the modification process for a configuration of an item of equipment.

The planning factors may also include maintaining forecast data or a scheduled, windowed resource plan 28 of scheduled maintenance activities to facilitate coordination for integration of multiple maintenance activities into a single coordinated maintenance activity or maintenance event scheduled in accordance with the method of FIG. 2.

Step S12 may follow step S10 as shown in FIG. 2. In step S12, a balanced configuration modification plan and schedule is arranged based upon the planning factors. The balanced configuration modification plan may be arranged to provide an integrated approach to updating a configuration or maintaining a configuration. The balanced configuration modification plan may include a priority scheme for conducting maintenance activities, a sequence for conducting maintenance activities consistent with the priority scheme, or both a priority scheme and a sequence. For example, the sequence of replacement parts may be standardized such that the ultimate or intermediate configurations of the equipment are tracked in an accurate manner.

Flexibility in meeting the balanced configuration modification plan may be attained by supporting interchangeability and substitution of certain components, assemblies and systems of an item of equipment. For example, the balanced configuration plan may determine on one possible date for scheduled maintenance contingent on all necessary resources for the maintenance being available and the equipment being available for repair. On the preliminary date, the primary component may not be available, whereas a secondary or replacement component may be available. Accordingly, the maintenance activity may be scheduled for the preliminary date by using the secondary component, where appropriate or authorized. Thus, the method of the invention may promote timely and more convenient scheduling of maintenance activity that would otherwise be possible without considering the availability of replacement components.

In step S14 a user or the data processing decides whether to institute the balanced configuration plan or at least a portion of the balanced configuration plan. A portion of the balanced configuration plan may be instituted where availability of components or resources might impede a full-blown maintenance plan because of interference with at least one of proper maintenance, desired reliability, and desired availability of an item of equipment. Accordingly, the data processing system 30 or user may make a management decision or judgment as to which components are available and whether to proceed with a maintenance activity that conforms to at least a portion of the balanced configuration plan. The decision to perform at least a portion of the balanced configuration plan, rather than an entire maintenance plan, may be based in part upon the realization of an expected benefit. The expected benefit refers to an improvement or maintenance of reliability or availability of the equipment for use if the portion of the balanced configuration plan is completed successfully.

The maintenance activity of a maintenance plan may be defined by the integration of inter-related maintenance activities that would otherwise be completed at different times within a maximum time frame. The activities may be inter-related if the maintenance activities pertain to the same location or zone of an item of equipment, for example. Accordingly, the maintenance activity may be executed to reduce or eliminate expenses by performing a single group of maintenance activities at once at a particular location and/or a single scheduled repair duration of the equipment. A maintenance worker, tools, test equipment, and facilities may only need to be allocated once, rather than multiple times. Further, the availability of the equipment may be increased by performing aggregated, inter-related maintenance activities once.

In step S16, the data processing system 30 allocates one or more of the following to facilitate execution of at least a portion of the balanced configuration plan: human resources, equipment-related resources, infrastructure resources, and any other resources. Human resources comprise one or more workers that directly or indirectly facilitate maintenance or otherwise support the accomplishment of maintenance (e.g., maintenance, repair, and overhaul activities). Equipment-related resources comprise one or more of the following: components, sub-components, an assembly, and a system. Infrastructure resources may comprise one or more of the following: facilities, parts of facilities, tools, test fixtures, test devices, and diagnostic equipment, test equipment, and computer-based support systems.

The resources may be defined by temporal availability, geographic constraints, or both. Each resource may be associated with an availability date, an availability timeframe, or another temporal indicator that indicates a prospective planned availability or actual availability of the underlying resource. Each of the resources may also be associated with a geographic identifier, particularly where the resource is limited to one or more geographic locations. For example, a worker may be limited to working in repair facilities within North America, whereas a second worker may be limited to working in repair facilities within Chicago, Ill. Similarly, each facility may be associated with a geographic identifier. If an item of equipment is mobile, the equipment may have a geographic identifier that is updated on a regular basis.

Figure 3:
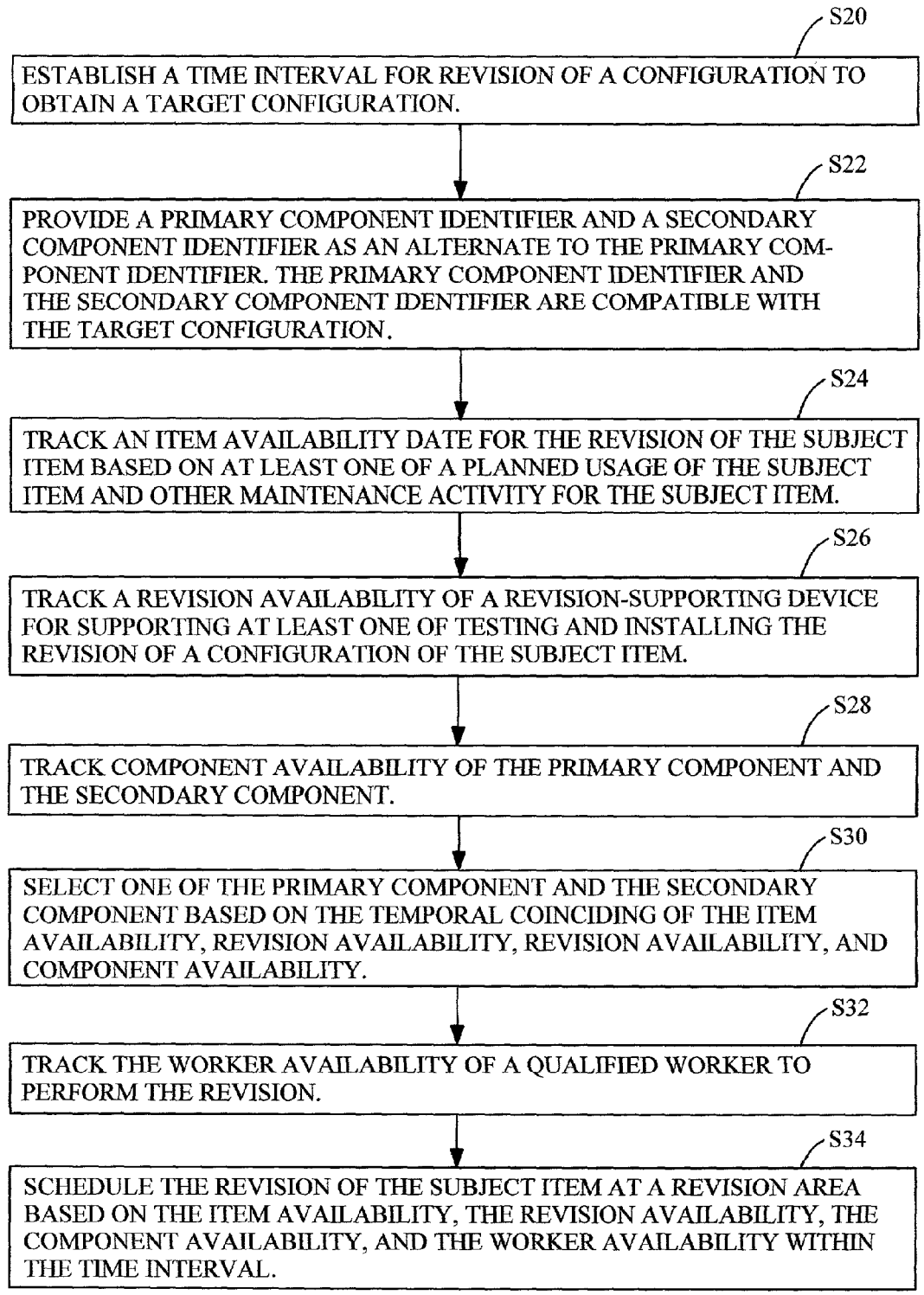
FIG. 3 is an alternative method for planning and scheduling a modification to a configuration of an item of equipment.

FIG. 3 shows a method for planning and scheduling one or more modifications to a configuration. The method of FIG. 3 starts in step S20.

In step S20, a time interval is established for revision of a configuration of equipment. The time interval represents a duration of time allocated or necessary to obtain a target configuration by modifying an existing configuration. The target configuration may include an update, a revision, or another change to the existing configuration to meet a design, a performance, a safety, an economic, or another objective. In one embodiment, the time interval comprises a range of dates for which a maintenance activity is planned. The time interval may be based upon a regulatory requirement in addition to other factors.

The existing configuration and the target configuration may be defined with reference to one or more of the following: physical configuration data, functional configuration data, operational configuration data, logical configuration data, and an integration data. The physical configuration data may generally include one or more of the following: component identifiers, sub-component identifiers, assembly identifiers, and system identifiers, along with data associated with a particular item identifier or equipment identifier. The item identifier or equipment identifier may be a serial number. For example, where the equipment is an aircraft, the equipment number may be regarded as a tail number. The item number or equipment number provides a unique identification for the particular item of equipment to distinguish that particular item from other items (e.g., similar items) of equipment.

The operational configuration data may take into account the usage of the equipment. The operational configuration data may include the operational data on one or more of the following: number of cycles of a system of the equipment, a number of hours of usage, another usage measurement data associated with the particular item or the particular equipment. Operational configuration data may be gathered by a sensor or a person associated with the equipment, by a system of the equipment, by a component of the equipment or otherwise.

Functional configuration data may describe the specifications, such as technical specifications for the equipment. The functional configuration data may define the configuration in terms of what the operational limitations of the equipment are or are expected to be, for example.

The logical configuration data may define components or the interrelationship between components or assemblies or systems. The logical configuration data may describe interrelationships and organization of the constituent members of the item of equipment.

In step S22, the data processing system 30 provides a primary component identifier and a secondary component identifier associated with revision of the target configuration. A primary component identifier identifies a primary component, whereas a secondary component identifier identifies a secondary component. A secondary component may represent a substantially equivalent replacement for a corresponding primary component. The secondary component identifier is regarded as an alternate to the primary component identifier.

Both the primary component identifier and the secondary component identifier refer to components that are compatible with the target configuration. For example, the primary component and the secondary component may comply with the same technical standard, or the primary component and the secondary component may meet the same minimal performance standard associated with the equipment. Accordingly, at least in limited circumstances, the secondary component may be used as a replacement for the primary component if the primary component is not available. The interchangeability between the primary component and the secondary component may afford greater flexibility in scheduling maintenance activities for the equipment and quicker turn-around time for at least one of a maintenance, repair, and overhaul activity.

In step S24, the data processing system 30 tracks the item-availability, date or time interval for the revision of an item. The availability date of the item of equipment may depend on one or more of the following: planned usage of the item of equipment and reconciling other planned maintenance activity for the item of equipment. The data processing system 30 may black out certain dates or times as not available for maintenance activity because of a holiday, a weekend, or another event. Further, the item availability may be restricted for other reasons such as a safety reason, a security reason, or a legal requirement. For example, in the event of an accident with the equipment, all maintenance activity may be postponed until an appropriate investigation and physical inspection for the causes of the accident may be completed and, if necessary, any appropriate government authorities may intervene.

In step S26, the data processing system 30 tracks a revision availability of a revision-supporting device, such as an infrastructure resource. The revision-supporting device may support at least one of testing and installing of the revision of a configuration to comply with the target configuration. The revision-supporting device may comprise a test fixture, test equipment, diagnostic equipment, a testing device, a tool, set of tools, infrastructure or another mechanism for supporting revision or a maintenance activity associated with compliance with the target configuration. In one embodiment, the revision-supporting device comprises a test device for testing an item of equipment after the revision has been completed to the equipment.

In step S28, the data processing system 30 may track component availability of the primary component and the secondary component associated with the maintenance activity for the configuration of the equipment. For example, primary component data may be associated with an availability date or an availability interval of the primary component. Similarly, the secondary component data may be associated with an availability or an availability interval of the secondary component. The availability dates of the secondary component and the primary component may overlap, coincide, or may be entirely different. If the availability dates or intervals are entirely different, the presence of a secondary component may provide greater flexibility in scheduling the repair, if the secondary component is an adequate replacement or substitute for the primary component (with respect to the subject item of equipment).

In step S30, the data processing system 30 selects one of the primary component and the secondary component based upon the temporal coinciding of item availability (of an item of equipment), revision availability (of the revision-support device), and component availability. The data processing system 30 selects the primary component if the item availability, revision availability, and component availability of the primary component coincide at a benchmark prospective time for execution of the maintenance activity. However, if the item availability, revision availability, and component availability only coincide at a later time than the benchmark prospective time, then the data processing system 30 may select the secondary component. For selection of the secondary component, the secondary component must be compliant with the target configuration and the item availability, revision availability, and component availability of the secondary component must coincide at or before the benchmark prospective time. The compliance of the secondary component is evaluated with respect to the subject item of equipment.

In step S32, the data processing system 30 tracks worker availability of a qualified worker to perform the revision. The qualified worker refers to a worker that is certified, trained or has experience performing the maintenance activity, repair or overhaul activity required to change the configuration from an existing configuration to the target configuration. The worker availability may be defined in terms of available time, available hours, available dates, unavailable dates or otherwise. Worker availability may include a geographic limitation associated with the worker, particularly where the worker has not agreed to travel or where the employment relationship between the worker and the business indicates that the employee would not be expected to travel to perform the maintenance activity.

In step S34, the data processing system 30 schedules the revision of the item at a revision area of a facility consistent with the item availability, the revision availability, the component availability, and the worker availability within the time interval. Accordingly, the planned and scheduled maintenance modifications are performed in an integrated environment that allows for the coordination for multiple facets affecting timely and economic maintenance of configurations.

In step S34, if applicable, multiple revisions may be combined during the time interval. The multiple revisions are preferably related to a single defective component, a single defective assembly or defective system, or provide an economy of scale in reducing the amount of service time for the equipment from the amount that would be necessary if repairs were undertaken separately on the subject item of equipment. In one example, a first revision is combined with the second revision where the first revision and the second revision are located in the same geographic zone or area of the equipment to permit ready assembly, disassembly, inspection and other maintenance activity to take place generally simultaneously (or serially during a single maintenance duration) in the same area of the equipment. In another example, the revision may be combined with a planned maintenance activity during the time interval.

In step S34, the item of equipment may be rerouted to a different revision area of a facility from a prior revision area of a facility where other maintenance activity was originally scheduled during the time interval to promote aggregation of multiple revisions into a single aggregate maintenance activity or combined revision. After step S34 an additional step may follow. The additional step may include canceling a prior revision and rescheduling the prior cancelled revision in a combined revision that includes the cancelled prior revision and the revision within the time interval.

Although step S30 precedes step S32 and S34, steps S30, S32, and S34 may be performed in any order or simultaneously.

The method of FIG. 2 and FIG. 3 may be applied to a multidimensional configuration. A multidimensional configuration may be defined in accordance with the functional configuration data, logical configuration data, physical configuration data and integration data, for example. The multidimensional configuration may include one or more of the following: a logical configuration, an operational configuration, a physical configuration, a redundant configuration, and self-healing configuration.

Figure 4:
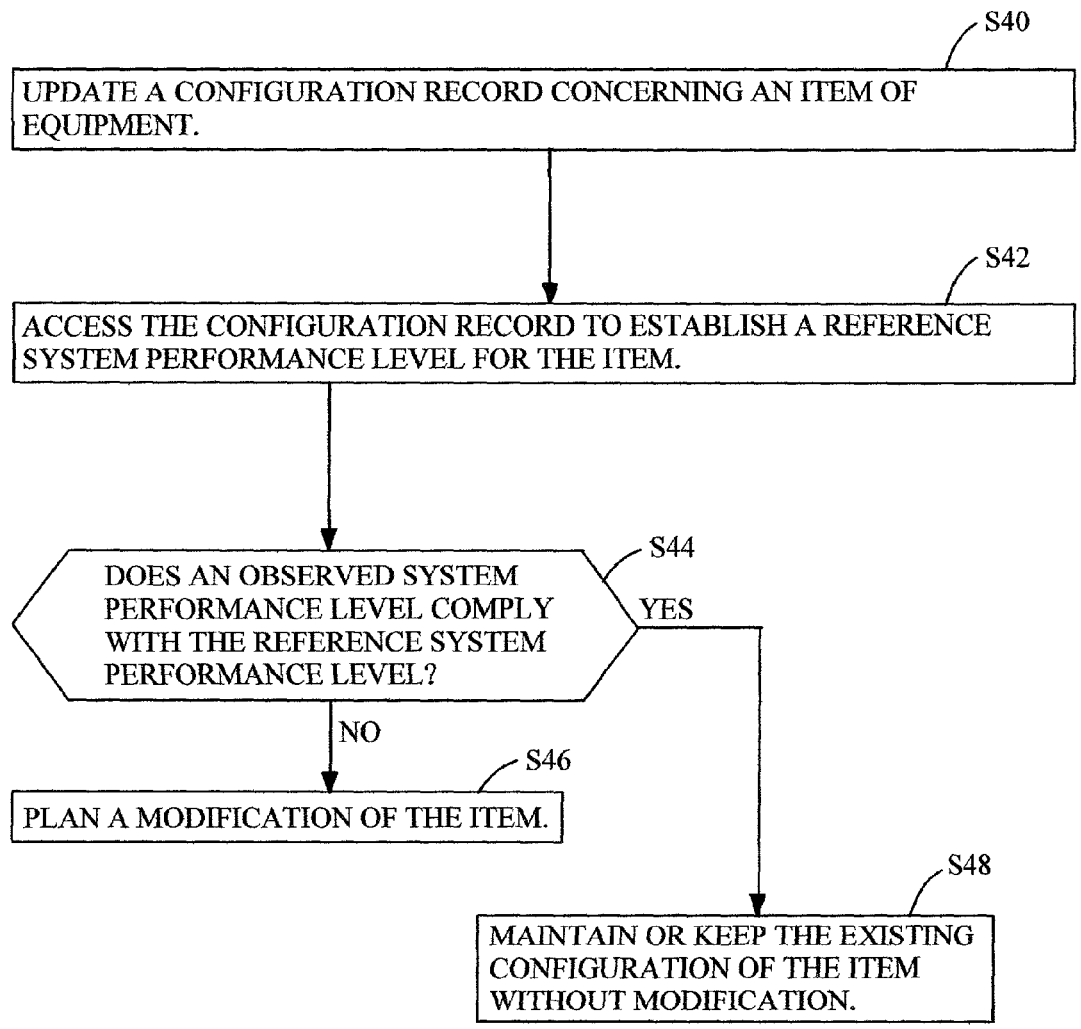
FIG. 4 is flowchart of a method for determining whether to modify an item of equipment.

FIG. 4 is a flow chart of a method for determining whether to modify an item of equipment, prior to undertaking planning and scheduling. The method of FIG. 4 is well-suited for application to a multi-dimensional configuration, which includes one or more of the following: a logical configuration, a functional configuration, a physical configuration, an operational configuration, a redundant configuration, and a self-healing configuration.

The method of FIG. 4 starts in step S40. In step S40, the data processing system 30 updates at least one configuration record concerning the item. For example, the data processing system 30 may update a data storage allocation (e.g., configuration definition 20 or a component configuration 24) in the data storage device 10.

In step S42, the data processing system 30 accesses the at least one configuration record to establish reference performance data (e.g., a reference performance level) for the item, component, or system of the item of equipment. For example, the data processing system 30 may access the specific end item maintenance plan 14 to obtain reference performance. The data processing system may derive the reference performance data from reference prediction data, standard performance data, original equipment manufacturer performance data, or the like.

In step S44, the data processing system 30 determines whether an observed performance data (e.g., an observed performance level) complies with the reference performance data (e.g., a reference performance level). If the data processing system 30 determines that the observed performance data does not comply with the reference performance data, the method continues with step S46. However, if the data processing system 30 determines that the observed performance data complies with the reference performance data the method continues with step S48.

In step S46, the data processing system 30 plans the modification of the item, consistent with any of the embodiments of the invention set forth in this document.

In step S48, the data processing system 30 maintains or keeps the status quo without any change or modification to the item. The configuration record may comprise one or more of the following: operational configuration data, functional configuration data, logical configuration data, and physical configuration data. In one embodiment, the reference performance information may be provided by an original equipment manufacturer. In another embodiment, the operational configuration data may represent non-original equipment manufacture supplied modifications.

Figure 5:
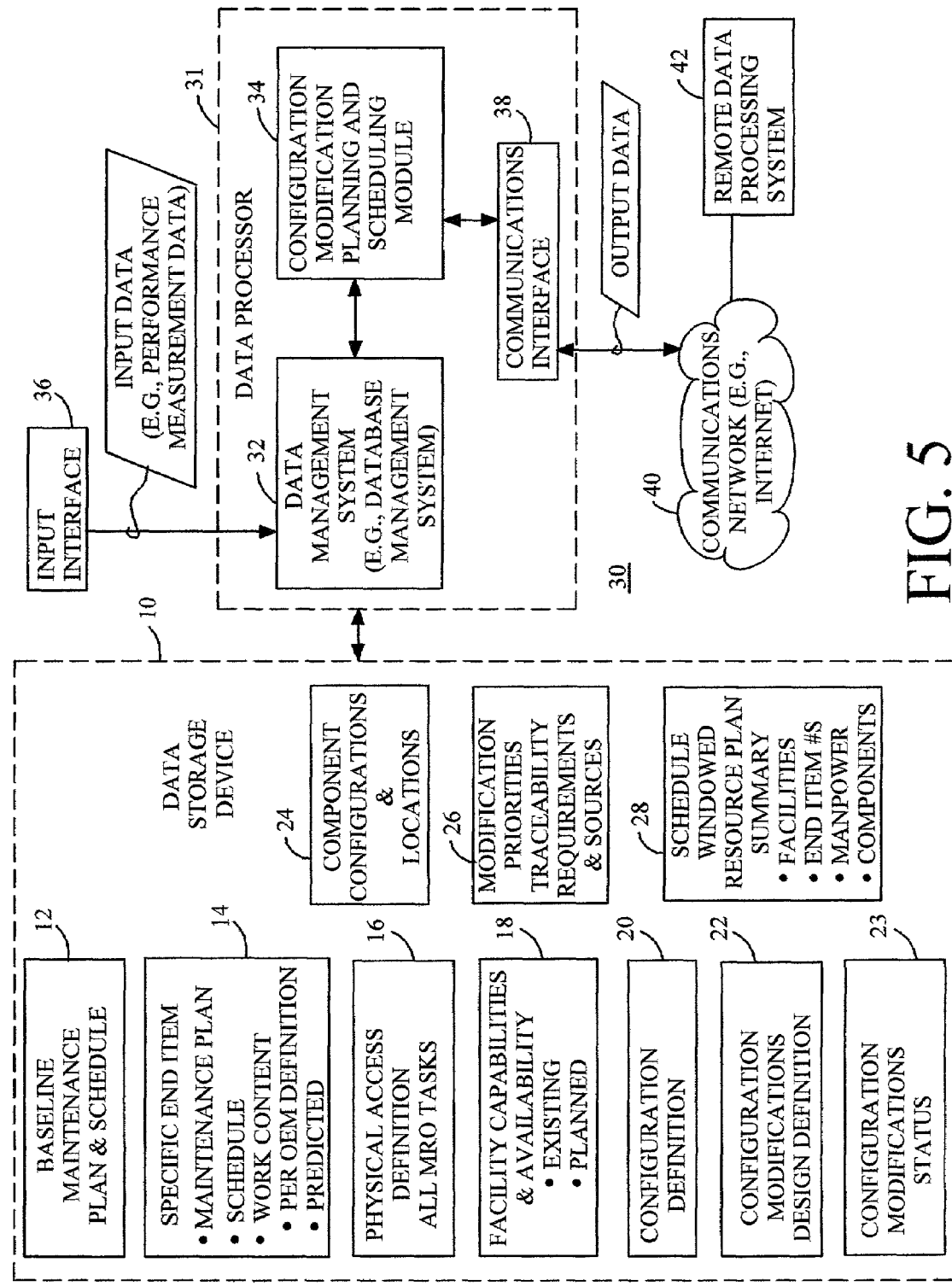
FIG. 5 is a block diagram of an alternate embodiment of a planning and scheduling modification system in accordance with the invention.

FIG. 5 is similar to FIG. 1 except a communications interface 38 and an input interface 36 are associated with the data processor 31. The configuration module 34 may be coupled to a communications interface 38 for interfacing remote data processing system 42 via a communications network 40 (e.g., the Internet). For example, the communications interface 38 may support the transfer or transmission of output data (e.g., a maintenance plan) from the data processing system 30 to the remote data processing system 42. The remote data processing system 42 may be affiliated with a trading partner of supplier of the maintenance provider, who manages the data processing system 30.

The input interface 36 may comprise a user interface that supports the entry of input data into the data processing system 30. For example, the input data may comprise performance measurement data.

The foregoing description of the method and system for planning and scheduling a modification of a configuration describes several illustrative examples the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The following is claimed:

1. A computerized method for generating a resultant configuration modification schedule for an item of equipment, the method comprising:
    establishing a baseline maintenance template for the item of equipment, the baseline maintenance template comprising baseline data fields which store maintenance priority indicators, component identifiers, corresponding maintenance activity dates and corresponding maintenance activity descriptors;
    wherein the maintenance activity descriptors distinguish between, for their associated components, replacement, repair, and rebuilding of the associated components; and wherein the maintenance priority indicators distinguish between mandatory and optional maintenance;
    establishing a specific item maintenance template associated with a specific item of the equipment identified by a serial number, the specific item maintenance template derived from the baseline maintenance template based on historical maintenance data associated with the specific item, the specific item maintenance template having specific template data fields that track the baseline data fields of the baseline maintenance template;
    establishing a component configuration database comprising configurations of components of the specific item of equipment by associating each sub-component of a corresponding component with a location identifier that identifies a location of each sub-component relative to the corresponding component;
    tracking planning factors relevant to a modification of an existing configuration of the specific item of equipment to reach a target configuration of the specific item of equipment, where tracking includes:
    storing and retrieving the planning factors applicable for changing the existing configuration to the target configuration, and determining technical requirements of maintenance for the specific item of equipment by retrieving data contained in the baseline data fields, the specific template data fields and the component configuration database, the data including the component identifiers, assembly identifiers, system identifiers, the serial number, equipment identifiers, and an item number;
    providing an input of the planning factors to a configuration module;
    establishing, in a data processing system, a preliminary configuration modification schedule based on the input of the planning factors to the configuration module, wherein the preliminary configuration modification schedule comprises a priority scheme for conducting maintenance activities for at least one of the components of the specific item of equipment, a sequence for conducting the maintenance activities, and a date for conducting the maintenance activities;
    determining by the data processing system an expected benefit of successful completion of a first portion of the preliminary configuration modification schedule instead of performance of the preliminary configuration modification schedule in its entirety, the expected benefit including an improvement of reliability or availability, or both, of the equipment for use if performance of the first portion is completed successfully;
    determining by the data processing system not to perform the preliminary configuration modification schedule in its entirety by:
    deciding to forgo performance of a second portion of the preliminary configuration modification schedule when a maintenance resource impedes performance of the entire preliminary configuration modification schedule and proceed with the first portion of the preliminary configuration modification schedule based on the expected benefit; and
    eliminating the second portion from the preliminary configuration modification schedule to obtain a resultant configuration modification schedule that includes the first portion of the preliminary configuration modification schedule and that omits the second portion of the preliminary configuration modification schedule.

2. The method of claim 1 where tracking comprises maintaining temporal availability data on at least one of maintenance equipment, repair facilities, test equipment, diagnostic equipment, based on other maintenance activities for other items.

3. The method of claim 1 where tracking comprises maintaining traceability data as one of the planning factors that tracks changes to an item on a real-time basis to allow visibility to different users to promote coordination and error reduction in the modification process.

4. The method of claim 1 where tracking comprises maintaining forecast data of scheduled maintenance activities as one of the planning factors.

5. A data processing system for generating a resultant configuration modification schedule for an item of equipment, comprising:
- a data storage allocation in a data storage device comprising a baseline maintenance template, a specific item maintenance template and a component configuration database,
  - the baseline maintenance template comprising baseline data fields which store maintenance priority indicators, component identifiers, corresponding maintenance activity dates and corresponding maintenance activity descriptors;
  - wherein the maintenance activity descriptors distinguish between, for their associated components, replacement, repair, and rebuilding of the associated components; and
  - wherein the maintenance priority indicators distinguish between mandatory and optional maintenance;
  - the specific item maintenance template of the equipment associated with a specific item of the equipment identified by a serial number, the specific item maintenance template derived from the baseline maintenance template based on historical maintenance data associated with the specific item, the specific item maintenance template having specific template data fields that track the baseline data fields of the baseline maintenance template;
  - the component configuration database comprising configurations of components of the specific item of equipment by associating each sub-component of a corresponding component with a location identifier that identifies a location of each sub-component relative to the corresponding component;
- a processor operable to track planning factors relevant to a modification of an existing configuration of the specific item of equipment to reach a target configuration of the specific item of equipment, wherein the processor is further operable to:
  - store and retrieve the planning factors applicable for changing the existing configuration to the target configuration, and determine technical requirements of maintenance for the specific item of equipment by retrieving data contained in the baseline data fields, the specific template data fields and the component configuration database, the data including the component identifiers, assembly identifiers, system identifiers, the serial number, equipment identifiers, and an item number; and
- a configuration module operable to receive an input of the planning factors using an input interface and establish a preliminary configuration modification schedule based on the input of the planning factors to the configuration module, wherein the preliminary configuration modification schedule comprises a priority schedule for conducting maintenance activities for at least one of the components of the specific item of equipment, a sequence for conducting the maintenance activities, and a date for conducting the maintenance activities;
- wherein the processor is operable to:
  - determine an expected benefit of successful completion of a first portion of the preliminary configuration modification schedule instead of performance of the preliminary configuration modification schedule in its entirety, the expected benefit including an improvement of reliability or availability, or both, of the equipment for use if performance of the first portion is completed successfully;
  - determine not to perform the preliminary configuration modification schedule in its entirety by deciding to forgo performance of a second portion of the preliminary configuration modification schedule when a maintenance resource impedes performance of the entire preliminary configuration modification schedule; and
  - proceed with the first portion based on the expected benefit; and
- wherein the configuration module is further operable to eliminate the second portion from the preliminary configuration modification schedule to obtain a resultant configuration modification schedule that includes the first portion of the preliminary configuration modification schedule and that omits the second portion of the preliminary configuration modification schedule.

6. The data processing system of claim 5 wherein the data storage allocation further stores a configuration record and a physical access definition,
- the configuration record comprising:
  - operational configuration data that defines operational performance for the item;
  - functional configuration data that defines technical specifications which the item is expected to meet;
  - logical configuration data that defines interrelationships between components of the item;
  - physical configuration data that identifies the components;
  - redundant configuration data that includes a hot-standby component; and
  - self-healing configuration data that specifies a fault tolerant architecture; and
- the physical access definition which defines a degree of physical access that is necessary to conduct a maintenance activity on the item of equipment and comprising:
  - a duration indicator representing a length of time that the physical access to the equipment is required;
  - a location indicator that defines a location on the equipment where a maintenance activity is required; and
- wherein the operational configuration data comprise non-original equipment manufacture supplied modifications.

7. The data processing system of claim 6, where the hot-standby component takes over upon failure of a primary component.

8. The data processing system of claim 6, where the technical specifications comprise performance specifications.

* * * * *

UNITED STATES PATENT AND TRADEMARK OFFICE
CERTIFICATE OF CORRECTION

| | | |
|---|---|---|
| PATENT NO. | : 7,461,008 B2 | Page 1 of 1 |
| APPLICATION NO. | : 09/947136 | |
| DATED | : December 2, 2008 | |
| INVENTOR(S) | : Garrow et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Twenty-second Day of November, 2011

David J. Kappos
*Director of the United States Patent and Trademark Office*